United States Patent
Nakasaka

(10) Patent No.: US 9,416,722 B2
(45) Date of Patent: Aug. 16, 2016

(54) CONTROL APPARATUS FOR INTERNAL COMBUSTION ENGINE

(75) Inventor: Yukihiro Nakasaka, Suntou-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 124 days.

(21) Appl. No.: 14/377,286

(22) PCT Filed: Feb. 8, 2012

(86) PCT No.: PCT/JP2012/052889
§ 371 (c)(1),
(2), (4) Date: Aug. 7, 2014

(87) PCT Pub. No.: WO2013/118263
PCT Pub. Date: Aug. 15, 2013

(65) Prior Publication Data
US 2015/0013331 A1   Jan. 15, 2015

(51) Int. Cl.
| F02D 23/00 | (2006.01) |
| F02B 33/44 | (2006.01) |
| F02B 37/04 | (2006.01) |
| F02D 11/10 | (2006.01) |
| F02B 37/22 | (2006.01) |
| F02B 37/12 | (2006.01) |
| F02B 37/18 | (2006.01) |

(52) U.S. Cl.
CPC .......... *F02B 37/04* (2013.01); *F02B 37/22* (2013.01); *F02D 11/105* (2013.01); *F02D 23/00* (2013.01); *F02B 37/18* (2013.01); *F02B 2037/122* (2013.01); *F02B 2037/125* (2013.01); *F02D 2200/703* (2013.01); *Y02T 10/144* (2013.01)

(58) Field of Classification Search
CPC .......... F02B 37/04; F02B 37/22; F02B 37/18; F02B 2037/122; F02B 2037/125; F02D 23/00; F02D 2200/703; Y02T 10/144
USPC .......... 60/602, 605.1; 701/102–104
See application file for complete search history.

(56) References Cited

U.S. PATENT DOCUMENTS 5,829,254 A * 11/1998 Hayashi .................. F02B 37/18
  60/602
5,850,738 A * 12/1998 Hayashi .................. F02B 37/18
  60/602

(Continued)

FOREIGN PATENT DOCUMENTS

| JP | H05-141258 A | 6/1993 |
| JP | H09-053457 | 2/1997 |

(Continued)

*Primary Examiner* — Thai Ba Trieu
(74) *Attorney, Agent, or Firm* — Kenyon & Kenyon LLP

(57) ABSTRACT

A control apparatus for an internal combustion engine of the present invention switches a steady-state characteristic that defines a relation between an engine load factor and a throttle opening degree between a high atmospheric pressure steady-state characteristic and a low atmospheric pressure steady-state characteristic in accordance with whether or not the atmospheric pressure is higher than a predetermined value. According to the low atmospheric pressure steady-state characteristic, a throttle opening degree corresponding to an identical engine load factor is set to a smaller value compared to the high atmospheric pressure steady-state characteristic in a medium load region, and the throttle opening degree is set so as to increase as the engine load factor increases towards a full load in a region on the side of a higher load factor than the medium load region.

3 Claims, 6 Drawing Sheets

(56) References Cited

U.S. PATENT DOCUMENTS

| | | | | |
|---|---|---|---|---|
| 5,899,069 | A * | 5/1999 | Watanabe | F02B 37/18 60/602 |
| 6,076,352 | A * | 6/2000 | Hayashi | F02B 37/18 60/602 |
| 6,192,867 | B1 * | 2/2001 | Fenchel | F02D 23/02 60/603 |
| 6,224,021 | B1 * | 5/2001 | Tanaka | F02D 29/02 244/221 |
| 6,244,050 | B1 * | 6/2001 | Aschner | F02D 23/02 60/600 |
| 7,434,397 | B2 * | 10/2008 | Hasegawa | F02D 23/00 60/602 |
| 7,677,227 | B2 * | 3/2010 | Sagisaka | F02B 37/18 123/559.1 |
| 7,945,371 | B2 * | 5/2011 | Burkhardt | F02D 41/0005 701/102 |
| 8,256,217 | B2 * | 9/2012 | Inoue | F02D 41/045 60/605.1 |
| 2014/0325983 | A1 * | 11/2014 | Tsunooka | F02D 9/02 60/602 |

FOREIGN PATENT DOCUMENTS

| | | |
|---|---|---|
| JP | 2002-213247 A | 7/2002 |
| JP | 2004-124745 A | 4/2004 |
| JP | 2006-125352 A | 5/2006 |
| JP | 2006-152821 A | 6/2006 |
| JP | 2010-014050 A | 1/2010 |

* cited by examiner

Steady-state characteristics referred to for the purpose of explanation of problem in first embodiment

*1: Without margin for control by throttle
*2: Low atmospheric pressure
*3: Standard state (approximately one atmosphere pressure)

Steady-state characteristics used in first embodiment

*4: Secured margin for control by throttle
*5: Low atmospheric pressure
*6: Standard state (approximately one atmosphere pressure)
*7: Closing of WGV from lower load factor → State in which the number of turbine rotations is high

*8: Decrease in compressor outlet pressure
*9: Compressor outlet pressure
*10: surge tank pressure
*11: Although responsiveness in initial state is fast, supercharging does not keep pace therewith

*12: Increase in margin for control by throttle
*13: Low atmospheric pressure (first embodiment)
*14: Low atmospheric pressure (third embodiment)
*15: Standard state (approximately one atmosphere pressure)

CONTROL APPARATUS FOR INTERNAL COMBUSTION ENGINE

CROSS-REFERENCE TO RELATED APPLICATIONS

This is a national phase application based on the PCT International Patent Application No. PCT/JP2012/052889 filed Feb. 8, 2012, the entire contents of which are incorporated herein by reference.

TECHNICAL FIELD

The present invention relates to a control apparatus for an internal combustion engine, and more particularly to a control apparatus for a supercharged internal combustion engine that includes a turbo-supercharger and a waste gate valve that opens and closes an exhaust bypass passage that bypasses a turbine of the turbo-supercharger.

BACKGROUND ART

A control apparatus for an internal combustion engine with a turbo-supercharger that includes a waste gate valve that opens and closes an exhaust bypass passage that bypasses a turbine has already been disclosed in, for example, Patent Document 1. According to the conventional control apparatus, a configuration is adopted so as to open a throttle valve as far as a substantially fully open position when an accelerator pedal is operated as far as a predetermined operation amount. Further, if the accelerator pedal is opened to a greater degree than the predetermined operation amount, a supercharging pressure is controlled by adjusting an opening degree of the waste gate valve so that a target supercharging pressure can be obtained that is in accordance with the detected operation amount of the accelerator pedal and the engine speed.

In an internal combustion engine with a turbo-supercharger, in a state in which the atmospheric pressure is low, such as in a highland region, in comparison to a state in which the atmospheric pressure is high (a standard state such as one atmosphere pressure), a pressure ratio (outlet pressure/inlet pressure) of a compressor of the turbo-supercharger increases in a condition in which an equivalent intake air amount (engine load factor) is obtained. That is, in a situation in which the atmospheric pressure is low, a range of control of the intake pressure by the turbo-supercharger increases when obtaining an equivalent supercharging pressure in comparison to a state in which the atmospheric pressure is high. Further, in general, the responsiveness of intake air amount control by a turbo-supercharger is lower than the responsiveness of intake air amount control by a throttle valve.

According to the technique disclosed in aforementioned Patent Document 1, when the accelerator pedal is opened to a greater degree than the aforementioned predetermined operation amount, the supercharging pressure (intake air amount) is controlled by adjusting the opening degree of the waste gate valve. That is, in this case, since it is not possible to secure a margin for control of the intake air amount (intake pipe pressure) by the throttle valve, intake air amount control is executed that is dependent on the turbo-supercharger with respect to which the responsiveness is low. Under a low atmospheric pressure, in comparison to the standard state, the throttle opening degree required to obtain the same intake air amount (engine load factor) increases. Therefore, under a low atmospheric pressure, a load region in which the necessity arises to perform intake air amount control that depends on the turbo-supercharger increases in comparison to the standard state. Consequently, under a low atmospheric pressure, the responsiveness with respect to an intake air amount when accelerating is likely to decrease in comparison to the standard state.

Including the above described document, the applicant is aware of the following documents as related art of the present invention.

CITATION LIST

Patent Documents

Patent Document 1: Japanese Laid-open Patent Application Publication No. 5-141258
Patent Document 2: Japanese Laid-open Patent Application Publication No. 2010-14050
Patent Document 3: Japanese Laid-open Patent Application Publication No. 2006-152821
Patent Document 4: Japanese Laid-open Patent Application Publication No. 2006-125352
Patent Document 5: Japanese Laid-open Patent Application Publication No. 2004-124745
Patent Document 6: Japanese Laid-open Patent Application Publication No. 9-53457
Patent Document 7: Japanese Laid-open Patent Application Publication No. 2002-213247

SUMMARY OF INVENTION

The present invention has been conceived to solve the above described problem, and an object of the present invention is to provide a control apparatus for an internal combustion engine that, in a case where the internal combustion engine includes a turbo-supercharger and a waste gate valve that opens and closes an exhaust bypass passage that bypasses a turbine of the turbo-supercharger, can improve responsiveness of an intake air amount when accelerating under a low atmospheric pressure.

The present invention is a control apparatus for an internal combustion engine that includes: a turbo-supercharger; a throttle valve; an exhaust bypass passage; a waste gate valve; steady-state characteristic switching means; first throttle control means; second throttle control means; and WGV control means.

The turbo-supercharger includes a compressor that is disposed in an intake passage and that supercharges intake air, and a turbine that is disposed in an exhaust passage and that operates by means of exhaust energy.

The throttle valve is disposed in the intake passage and adjusts an intake air amount.

The exhaust bypass passage is arranged so as to branch off from the exhaust passage on an upstream side of the turbine, and merge again with the exhaust passage on a downstream side of the turbine.

The waste gate valve is configured to be capable of opening and closing the exhaust bypass passage.

The steady-state characteristic switching means has, as a steady-state characteristic that defines a relation between an engine load factor and a throttle opening degree in a steady state, a high atmospheric pressure steady-state characteristic that is used under a high atmospheric pressure that is an atmospheric pressure that is higher than a predetermined value and a low atmospheric pressure steady-state characteristic that is used under a low atmospheric pressure that is an atmospheric pressure that is less than or equal to the predetermined value, the steady-state characteristic switching means being for switching the steady-state characteristic between the high atmospheric pressure steady-state characteristic and the low atmospheric pressure steady-state characteristic in accordance with whether or not the atmospheric pressure is higher than the predetermined value.

The first throttle control means controls a throttle opening degree so that, in a case where a request is made to increase an intake air amount at a rate of change that is lower than a predetermined rate, the throttle opening degree becomes a target throttle opening degree that is obtained based on the high atmospheric pressure steady-state characteristic or the low atmospheric pressure steady-state characteristic that is selected by the steady-state characteristic switching means and on a target engine load ratio in this case.

The second throttle control means controls a throttle opening degree so that, in a case where a request is made to increase an intake air amount at a rate of change that is greater than or equal to the predetermined rate under the low atmospheric pressure, the throttle opening degree becomes a target throttle opening degree that is greater than a value obtained based on the low atmospheric pressure steady-state characteristic that is selected by the steady-state characteristic switching means and on a target engine load factor in this case.

According to the low atmospheric pressure steady-state characteristic, a throttle opening degree corresponding to an identical engine load factor is set to a smaller value in comparison to the high atmospheric pressure steady-state characteristic in a medium load region, and the throttle opening degree is set so as to increase as the engine load factor increases towards a full load in a region on a side of a higher load factor than the medium load region.

Further, under a circumstance in which the low atmospheric pressure steady-state characteristic is used, the WGV control means controls the opening degree of the waste gate valve to a value on a closing side, in association with the throttle opening degree corresponding to an identical engine load factor being controlled to a smaller value in comparison to the high atmospheric pressure steady-state characteristic in the medium load region.

According to the present invention, a steady-state characteristic that defines the relation between the engine load factor and the throttle opening degree is switched between the high atmospheric pressure steady-state characteristic and the low atmospheric pressure steady-state characteristic in accordance with whether or not the atmospheric pressure is higher than the predetermined value. In a case where a request is not made to increase the intake air amount at a rate that is greater than or equal to the predetermined rate under a low atmospheric pressure, the throttle opening degree is controlled according to the low atmospheric pressure steady-state characteristic. As a result, in a region from a medium load factor to a high load factor, a margin for control of the intake air amount (intake pipe pressure) by means of the throttle valve is secured. Therefore, in a case where a request is made thereafter to increase the intake air amount at a rate that is equal to or greater than the predetermined rate, the intake air amount can be controlled utilizing the margin for control by the throttle valve that is secured. Thus, under a low atmospheric pressure in which the degree of dependence with respect to control of the intake air amount on the turbo-supercharger which has a low level of responsiveness increases if a situation is one which does not have the low atmospheric pressure steady-state characteristic, the responsiveness of the intake air amount when accelerating from a medium load region to a high load region can be improved by controlling the intake air amount by means of the throttle valve which has relatively high responsiveness.

In addition, the second throttle control means of the present invention may be means for restricting an operating speed of the throttle valve so as not to exceed a predetermined upper limit value when increasing the throttle opening degree.

Thus, a compressor outlet pressure and a throttle downstream pressure can be raised towards a target value at the fastest rate as the rate of response of an intake air amount at the time of a request to increase the intake air amount, without leading to a drop in the compressor outlet pressure in an initial acceleration stage that is caused by increasing the throttle opening degree at an excessive operating speed.

Furthermore, the low atmospheric pressure steady-state characteristic according to the present invention may be a characteristic that is set so that, in the medium load region, the throttle opening degree decreases as the engine load factor increases.

Thus, in a region that is equal to or higher than the medium load region, an even larger margin for control of the intake air amount (intake pipe pressure) by the throttle valve can be secured. It is thereby possible to further improve the responsiveness of the intake air amount when a request is made to increase the intake air amount at a rate that is equal to or greater than the predetermined rate under a low atmospheric pressure.

DESCRIPTION OF EMBODIMENTS

First Embodiment

Explanation of System Configuration

Figure 1:
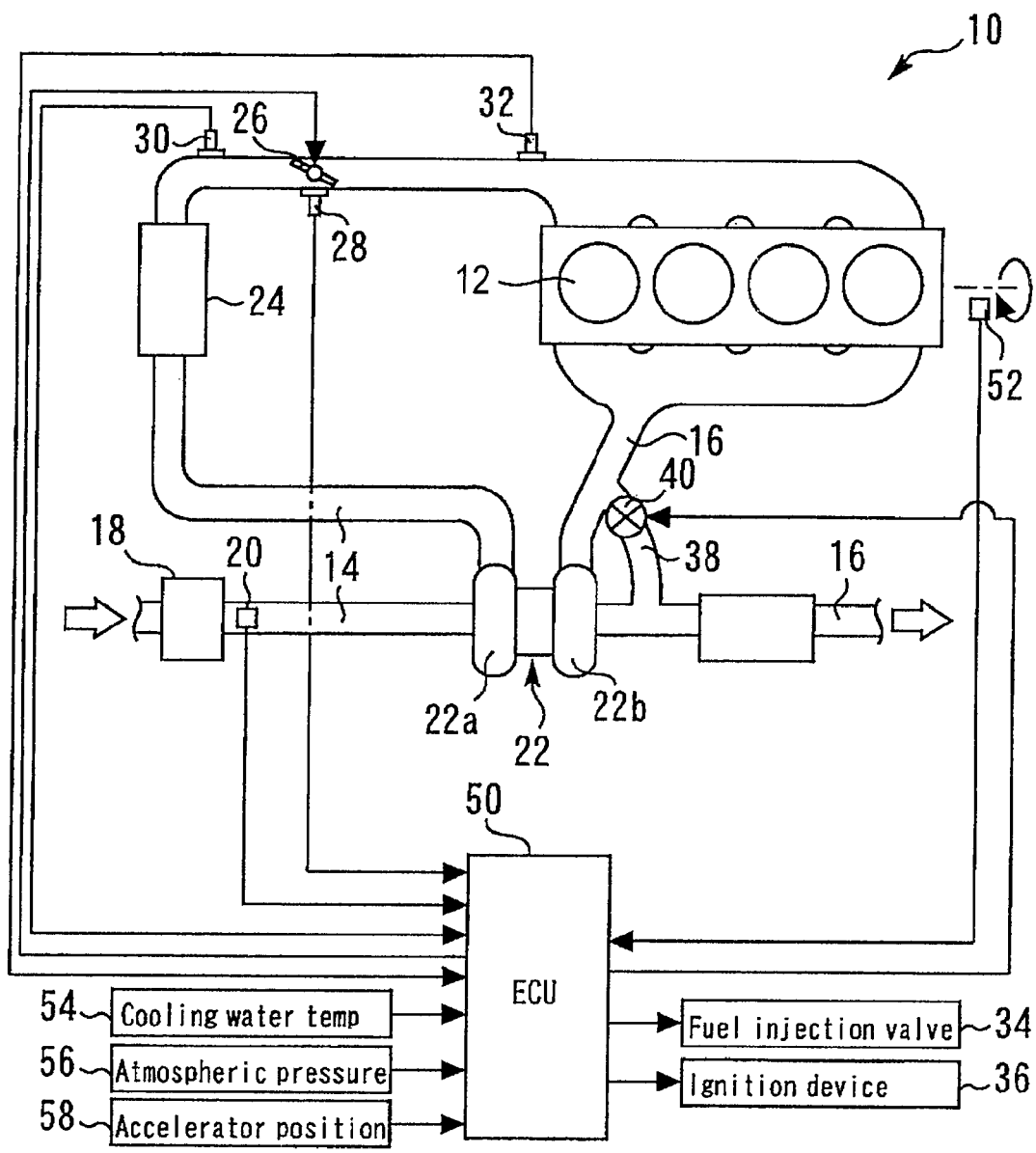
FIG. 1 is a schematic view for describing a system configuration of an internal combustion engine of a first embodiment of the present invention.

FIG. 1 is a schematic view for describing the system configuration of an internal combustion engine 10 of a first embodiment of the present invention. A system of the present embodiment includes a spark ignition type internal combustion engine (as one example, a gasoline engine) 10. A combustion chamber 12 is formed inside each cylinder of the internal combustion engine 10. An intake passage 14 and an exhaust passage 16 communicate with the combustion chamber 12.

An air cleaner 18 is installed in the vicinity of an inlet of the intake passage 14. An air flow meter 20 that outputs a signal in accordance with a flow rate of air that is drawn into the intake passage 14 is provided in the vicinity of the air cleaner 18 on a downstream side thereof. A compressor 22a of a turbo-supercharger 22 is arranged downstream of the air flow meter 20. The compressor 22a is integrally connected through a connecting shaft (not illustrated in the drawings) with a turbine 22b arranged in the exhaust passage 16.

An intercooler 24 that cools compressed air is provided on a downstream side of the compressor 22a. An electronically controlled throttle valve 26 is provided downstream of the intercooler 24. A throttle opening degree sensor 28 for detecting a throttle opening degree is arranged in the vicinity of the throttle valve 26. At a position in the intake passage 14 that is on an upstream side of the throttle valve 26 and on a downstream side of the compressor 22a (and the intercooler 24), a throttle upstream pressure sensor 30 is installed that detects an intake pressure (throttle upstream pressure) at the aforementioned location. Further, at a position in the intake passage 14 on a downstream side of the throttle valve 26 (collector portion (surge tank portion) of the intake manifold), a throttle downstream pressure sensor 32 is installed that detects an intake pressure (throttle downstream pressure) at the aforementioned location.

Each cylinder of the internal combustion engine 10 is provided with a fuel injection valve 34 for injecting fuel into the cylinder, and an ignition device 36 for igniting an air-fuel mixture. An exhaust bypass passage 38 is connected to the exhaust passage 16. The exhaust bypass passage 38 is configured to branch off from the exhaust passage 16 at a location that is on an upstream side than the turbine 22b, and to merge again with the exhaust passage 16 at a location that is on a downstream side than the turbine 22b. A waste gate valve (WGV) 40 that is capable of opening and closing the exhaust bypass passage 38 is provided partway along the exhaust bypass passage 38. In this case, it is assumed that the WGV 40 is configured to be adjustable to an arbitrary opening degree by means of an electric motor (not illustrated in the drawings).

The system shown in FIG. 1 also includes an ECU (electronic control unit) 50. In addition to the air flow meter 20, the throttle opening degree sensor 28, the throttle upstream pressure sensor 30 and the throttle downstream pressure sensor 32 that are described above, various sensors for detecting the operational state of the internal combustion engine 10 such as a crank angle sensor 52 for detecting the engine speed and the crank angle and a water temperature sensor 54 for detecting an engine cooling water temperature are connected to the ECU 50. Further, an atmospheric pressure sensor 56 for detecting the atmospheric pressure, and an accelerator position sensor 58 for detecting a depression amount of an accelerator pedal (accelerator position) of the vehicle in which the internal combustion engine 10 is mounted are connected to the ECU 50. In addition, various actuators for controlling the operational state of the internal combustion engine 10 such as the throttle valve 26, the fuel injection valve 34, the ignition device 36 and the WGV 40 that are described above are connected to the ECU 50. The ECU 50 controls the operational state of the internal combustion engine 10 by causing the various actuators to operate in accordance with predetermined programs and the outputs of the respective sensors that are described above.

[Problem Relating to Responsiveness of Intake Air Amount when Accelerating Under Low Atmospheric Pressure]

Figure 2:
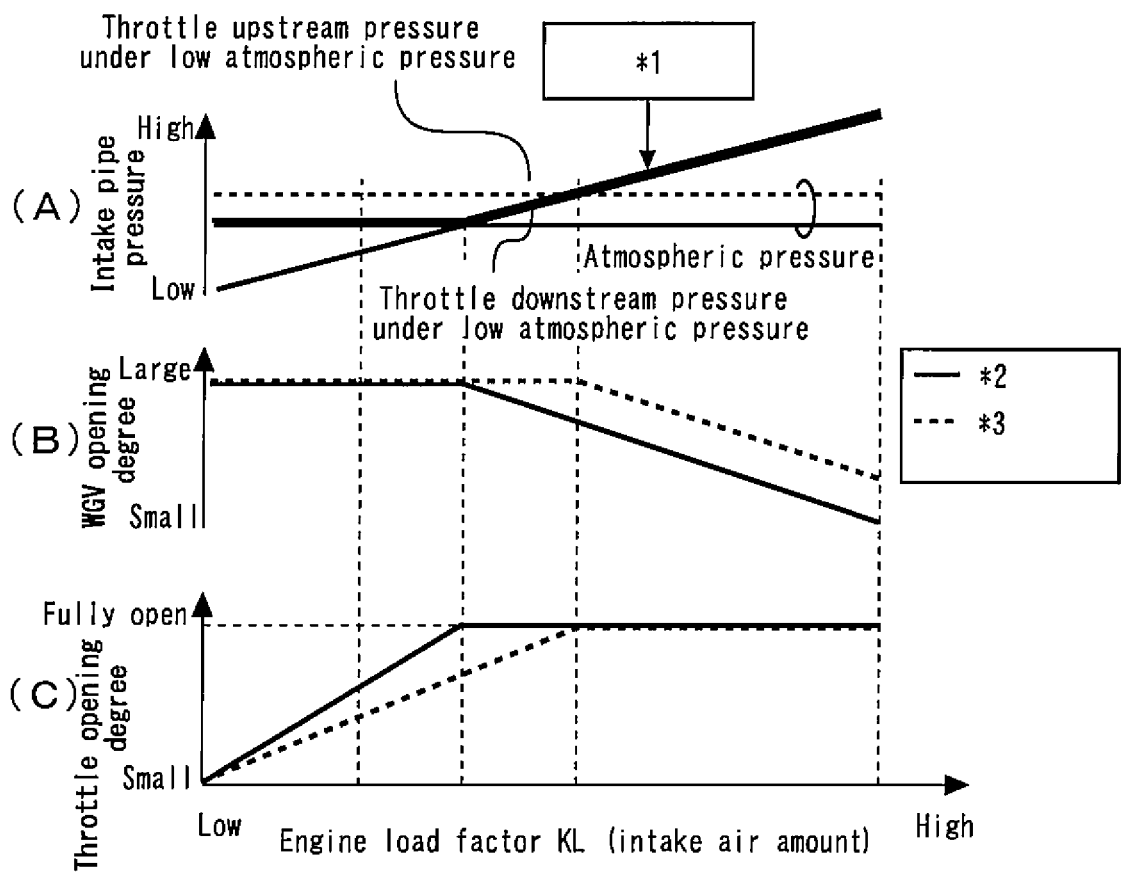
FIG. 2 has views for describing a problem relating to responsiveness of intake air amounts when accelerating under a low atmospheric pressure, and illustrates steady-state characteristics that are referred to for the purpose of comparison with settings of steady-state characteristics shown in FIG. 3 according to the first embodiment of the present embodiment.

FIG. 2 has views for describing a problem relating to responsiveness of intake air amounts when accelerating under a low atmospheric pressure, and illustrates steady-state characteristics that are referred to for the purpose of comparison with settings of steady-state characteristics according to the present embodiment (see FIG. 3 that is described later). More specifically, FIG. 2 illustrates a state at a predetermined engine speed. FIG. 2(A) is a view illustrating a steady-state characteristic between an engine load factor KL and an intake pipe pressure (throttle upstream pressure and throttle downstream pressure) under a low atmospheric pressure. FIG. 2(B) is a view illustrating a steady-state characteristic between the engine load factor KL and a WGV opening degree (hereunder, referred to simply as "load factor-WGV steady-state characteristic"). FIG. 2(C) is a view illustrating a steady-state characteristic between the engine load factor KL and a throttle opening degree (hereunder, referred to simply as "load factor-throttle steady-state characteristic"). Note that waveforms shown by broken lines in FIG. 2 represent a characteristic when the atmospheric pressure is a standard state (approximately one atmosphere pressure), and waveforms indicated by solid lines in FIG. 2 represent a characteristic at a low atmospheric pressure state in which the atmospheric pressure is lower than the standard state. Further, as used herein, the term "engine load factor KL" refers to a ratio of the current intake air amount with respect to a maximum value of the intake air amount (intake air amount at the time of a full load) corresponding to each engine speed, and is a value that can be calculated on the basis of the intake air amount and the engine speed.

As shown by the "broken line" in FIG. 2(C), the load factor-throttle steady-state characteristic in the standard state is set so that, as the load factor transitions from a very low load region to a region on a high load factor side, the throttle opening degree increases (here, as one example, at a constant rate of change) towards a fully-open opening degree (maximum opening degree in a control range), and after reaching the fully-open opening degree, the throttle opening degree becomes constant at the fully-open opening degree. In contrast, as shown by the "broken line" in FIG. 2(B), the load factor-WGV steady-state characteristic in the standard state is set so that: the WGV opening degree becomes a predetermined maximum opening degree (maximum value in a predetermined control range of the WGV opening degree) in a region on a low load factor side in which the throttle opening degree is less than the fully-open opening degree; and in a region on the high load factor side after the throttle opening degree becomes the fully-open opening degree, by controlling the WGV opening degree so as to decrease (to the closing side), intake air amounts are obtained that realize each engine load factor KL by utilizing control of the WGV opening degree.

With respect to a low atmospheric pressure condition in which the atmospheric pressure is lower than the standard state, steady-state characteristics that are set on the basis of the same idea as the above described steady-state characteristics in the standard state are as follows. That is, when adjusting the intake air amount using the throttle valve 26 under a low atmospheric pressure, in order to obtain the same intake air amount (engine load factor KL) as in the standard state it is necessary to increase the throttle opening degree relative to the standard state. Therefore, as shown by the "solid line" in FIG. 2(C), in a region on the low load factor side of the load factor-throttle steady-state characteristic under a low atmospheric pressure, the throttle opening degree is controlled so as to increase towards the fully-open opening degree at a faster rate of change than in the standard state as the engine load factor KL increases. As a result, the engine load factor KL when the throttle opening degree reaches the fully-open opening degree is a value on the low load factor side in comparison to the standard state. Accompanying this, as shown by the "solid line" in FIG. 2(B), according to the load factor-WGV steady-state characteristic under the low atmospheric pressure, the WGV opening degree is controlled so as to begin to close from a lower engine load factor KL in comparison to the standard state.

In a case that has the above-described steady-state characteristics under a low atmospheric pressure, as shown in FIG. 2(A), as the engine load factor KL increases, the throttle downstream pressure rises in association with an increase in the throttle opening degree or a decrease in the WGV opening degree. In contrast, with respect to the throttle upstream pressure in this case, since the WGV 40 is opened sufficiently in a region until the throttle opening degree reaches the fully-open opening degree and supercharging is not performed, the throttle upstream pressure transitions in a manner in which the value thereof is fixed at the atmospheric pressure value in this case. Thereafter, supercharging is started and the throttle upstream pressure rises in association with an increase in the engine load factor KL at a value that is approximately equal to the throttle downstream pressure. Note that this steady-state characteristic of the throttle upstream pressure and downstream pressure with respect to the engine load factor KL exhibits a similar tendency under standard atmospheric pressure also, although there are differences with respect to the values.

In an internal combustion engine equipped with a turbo-supercharger such as the internal combustion engine 10 of the present embodiment, in a state in which the atmospheric pressure is low, such as in a highland area, in comparison to a state in which the atmospheric pressure is high (a standard state), the pressure ratio (outlet pressure/inlet pressure) of the compressor of the turbo-supercharger increases in a condition in which an equal intake air amount (engine load factor KL) is obtained. That is under circumstances in which the atmospheric pressure is low, compared to the standard state, the range of control of the intake pressure by the turbo-supercharger increases at the time of obtaining an equivalent supercharging pressure. Furthermore, in general, the responsiveness of intake air amount control performed by a turbo-supercharger is lower than the responsiveness of intake air amount control performed by a throttle valve.

According to the settings of the load factor-throttle steady-state characteristic shown in above described FIG. 2, in a region on the side of a higher load factor than the engine load factor KL at which the throttle opening degree reaches the fully-open opening degree, the intake air amount (supercharging pressure) is controlled using an opening degree adjustment of the WGV 40. That is, according to the aforementioned steady-state characteristic, in the region on a higher load factor side than the engine load factor KL when the throttle opening degree reaches the fully-open opening degree, since it is not possible to secure a margin for control of the intake air amount (intake pipe pressure) by the throttle valve 26, intake air amount control that depends on the turbo-supercharger 22 that has low responsiveness is executed. As shown in FIG. 2, under low atmospheric pressure, a load region in which the necessity arises to perform intake air amount control that depends on the turbo-supercharger 22 increases in comparison to the standard state. Therefore, under low atmospheric pressure, the responsiveness of an intake air amount when accelerating is likely to decrease compared to the standard state.

[Settings of Characteristic Load Factor-Throttle Steady-State Characteristic and Load Factor-WGV Steady-State Characteristic in First Embodiment]

Figure 3:
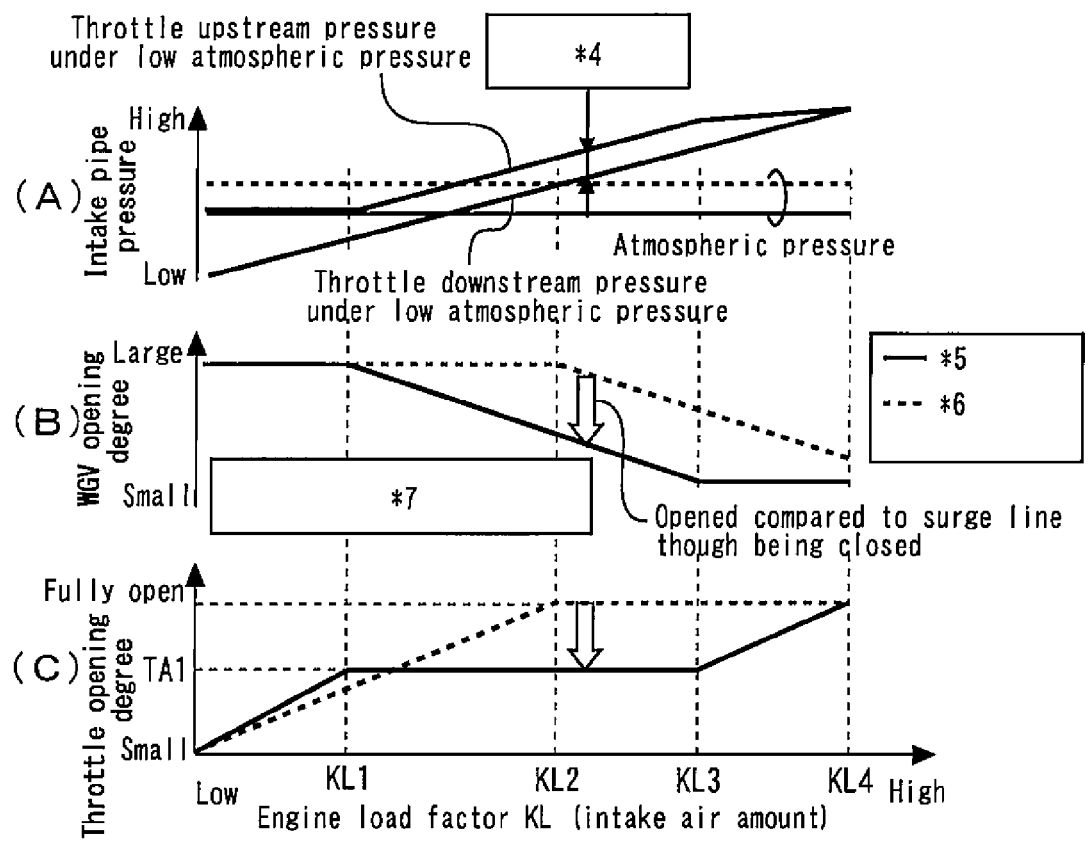
FIG. 3 has views for describing two kinds of load factor-throttle steady-state characteristics and load factor-WGV steady-state characteristics that can be switched according to a rise or fall in atmospheric pressure according to the first embodiment of the present invention.

FIG. 3 has views for describing two kinds of load factor-throttle steady-state characteristics and load factor-WGV steady-state characteristics that can be switched according to a rise or fall in atmospheric pressure according to the first embodiment of the present invention. More specifically, FIG. 3 illustrates a state at a predetermined engine speed. FIG. 3(A) is a view illustrating a steady-state characteristic between the engine load factor KL and the intake pipe pressure (throttle upstream pressure and throttle downstream pressure) under a low atmospheric pressure. FIG. 3(B) is a view illustrating a load factor-WGV steady-state characteristic. FIG. 3(C) is a view illustrating a load factor-throttle steady-state characteristic. Note that waveforms shown by broken lines in FIG. 3 represent a characteristic when the atmospheric pressure is a standard state (approximately one atmosphere pressure), and waveforms shown by solid lines in FIG. 3 represent a characteristic at a low atmospheric pressure state in which the atmospheric pressure is lower than the standard state. The steady-state characteristics shown in FIGS. 3(B) and 3(C) are characteristics that change according to the engine speed. Therefore, it is assumed in the present embodiment that, as these steady-state characteristics, settings for which the tendencies of the settings are the same as in FIG. 3 are prepared for each predetermined engine speed.

As shown by the broken lines in FIG. 3, a load factor-throttle steady-state characteristic (hereunder, may also be referred to as "high atmospheric pressure steady-state characteristic of throttle") and a load factor-WGV steady-state characteristic (high atmospheric pressure steady-state characteristic of WGV) in a state (standard state) in which the atmospheric pressure is higher than a predetermined value are the same as the corresponding characteristics shown in FIG. 2.

In contrast, as shown in FIG. 3(C), with respect to a load factor-throttle steady-state characteristic in a low atmospheric pressure state in which the atmospheric pressure is equal to or less than the aforementioned predetermined value (hereunder, may be referred to as "low atmospheric pressure steady-state characteristic of throttle"), the throttle opening degree corresponding to the same engine load factor KL is set to a smaller value compared to a high atmospheric pressure steady-state characteristic of the throttle in a medium load region (KL1 to KL3). Furthermore, the low atmospheric pressure steady-state characteristic of the throttle is set so that the throttle opening degree increases towards the fully-open opening degree as the engine load factor KL increases towards a full load (KL4) in a region (KL3 to KL4 (100%)) on the side of a higher load factor relative to the medium load region. More specifically, according to the example shown in FIG. 3, the throttle opening degree in the medium load region (KL1 to KL3) is set to a predetermined constant opening degree TA1 that is less than the fully-open opening degree. Note that the reason the rate of change of the throttle opening degree with respect to the engine load factor KL is set higher for a time of low atmospheric pressure compared to the standard state in a low load region in which the engine load factor is lower than the engine load factor KL1 is that, as described in the foregoing, in order to obtain the same intake air amount (engine load factor KL) as in the standard state, it is necessary to control the throttle opening degree so as to open to a larger degree in comparison to the standard state.

The low atmospheric pressure steady-state characteristic of the WGV is set so that, at an end (KL1) on the low load factor side of the medium load region (KL1 to KL3) in which adjustment of the throttle opening degree is stopped, the WGV 40 begins to close from an engine load factor KL on the side of a lower load factor in comparison to the high atmospheric pressure steady-state characteristic of the WGV. Further, the WGV opening degree in the medium load region (KL1 to KL3) is set so as to be closed to a greater degree as the engine load factor KL increases under a condition in which the throttle opening degree is fixed. This is done to compensate for the insufficient intake air amount relative to the standard state by means of the low atmospheric pressure steady-state characteristic of the throttle. In addition, the WGV opening degree in a region (KL3 to KL4) that is on the side of a higher load factor relative to the medium load region is set so as to be approximately constant at a value (a predetermined value on the opening side relative to the surge line of the compressor 22*a*) for the time of the engine load factor KL3.

As shown in FIG. 3(A), the throttle downstream pressure in a case where the low atmospheric pressure steady-state characteristics of the throttle and the WGV are being used rises in association with an increase in the throttle opening degree or a decrease in the WGV opening degree accompanying an increase in the engine load factor KL. On the other hand, until reaching the engine load factor KL1 at which the WGV 40 starts to close, the throttle upstream pressure in this case transitions in a manner in which the value thereof is fixed at the atmospheric pressure value in this case because supercharging is not performed. Thereafter, the number of turbine rotations enters a higher state as the WGV 40 is being closed, and supercharging proceeds. That is, according to the present settings, at the engine load factor KL1 that corresponds to the throttle opening degree TA 1 that is smaller than the fully-open opening degree, an increase in the throttle opening degree in accordance with an increase in the engine load factor KL is stopped and closing of the WGV 40 is begun, and therefore, unlike the settings illustrated in FIG. 2 described above, a significant difference is secured between the throttle upstream pressure and the throttle downstream pressure.

According to the example illustrated in FIG. 3, since the settings are such that the WGV 40 is closed in association with an increase in the engine load factor KL instead of an adjustment of the opening degree of the throttle valve 26 in the medium load region (KL1 to KL3), the difference between the throttle upstream pressure and the throttle downstream pressure is maintained. Further, in a region on a higher load factor side relative to the medium load region (KL1 to KL3) also, the throttle upstream pressure rises in association with an increase in the engine load factor KL. However, since the WGV opening degree is made approximately constant and the throttle valve 26 is opened, the throttle upstream pressure in this region rises more moderately than in the medium load region (KL1 to KL3) in association with an increase in the engine load factor KL. Further, in this region, since the settings are such that the throttle valve 26 opens towards the fully-open opening degree in association with an increase in the engine load factor KL, the difference between the throttle upstream pressure and the throttle downstream pressure decreases in association with an increase in the throttle opening degree.

As described above, according to the low atmospheric pressure steady-state characteristics of the throttle and the WGV in the present embodiment, in a region from a medium load factor to a high load factor in which it is assumed that if a situation is one in which the steady-state characteristics shown in above described FIG. 2 are used, the throttle opening degree is the fully-open opening degree, it is possible to secure a significant difference between the throttle upstream pressure and the throttle downstream pressure, that is, a margin for control of the intake air amount (intake pipe pressure) by the throttle valve 26. Further, according to this low atmospheric pressure steady-state characteristic, the number of turbine rotations can be placed in a high state from a time of use in a region on a lower load factor side in comparison to the high atmospheric pressure steady-state characteristic.

According to the present embodiment, in a case where a request is made to increase an intake air amount at a rate of change that is lower than a predetermined rate (time of a moderate acceleration request), the steady-state characteristics of the throttle and the WGV that are used are switched according to whether or not the atmospheric pressure is higher than a predetermined value. More specifically, under a high atmospheric pressure (standard state) in which the atmospheric pressure is higher than the aforementioned predetermined value, the high atmospheric pressure steady-state characteristics of the throttle and the WGV (waveforms shown by broken lines in FIG. 3) are selected, while under a low atmospheric pressure in which the atmospheric pressure is less than or equal to the aforementioned predetermined value, the low atmospheric pressure steady-state characteristics of the throttle and the WGV (waveforms shown by solid lines in FIG. 3) are selected. Further, in a case where a request has been made to increase the intake air amount at a rate of change that is lower than the aforementioned predetermined rate (time of a moderate acceleration request), the steady-state characteristics for a time of a high atmospheric pressure or a time of a low atmospheric pressure that were selected are referred to, and a target throttle opening degree and a target WGV opening degree are calculated that correspond to the target engine load factor (target intake air amount) for the current acceleration. The throttle valve 26 and the WGV 40 are controlled so as to obtain the target throttle opening degree and the target WGV opening degree, respectively.

In contrast, according to the present embodiment, in a case where a request is made to increase the intake air amount at a rate of change that is greater than or equal to the aforementioned predetermined rate (time of a rapid acceleration request) under a low atmospheric pressure when the atmospheric pressure is less than or equal to the aforementioned predetermined value, the target throttle opening degree is calculated as a value that is larger than a throttle opening degree acquired by referring to the low atmospheric pressure steady-state characteristic of the throttle as a value corresponding to a target engine load factor (target intake air amount) at the time of the current acceleration. Further, the target WGV opening degree in this case is calculated as a value corresponding to a target engine load factor (target intake air amount) at the time of the current acceleration, by referring to the steady-state characteristic for a time of a low atmospheric pressure of the WGV.

Figure 4:
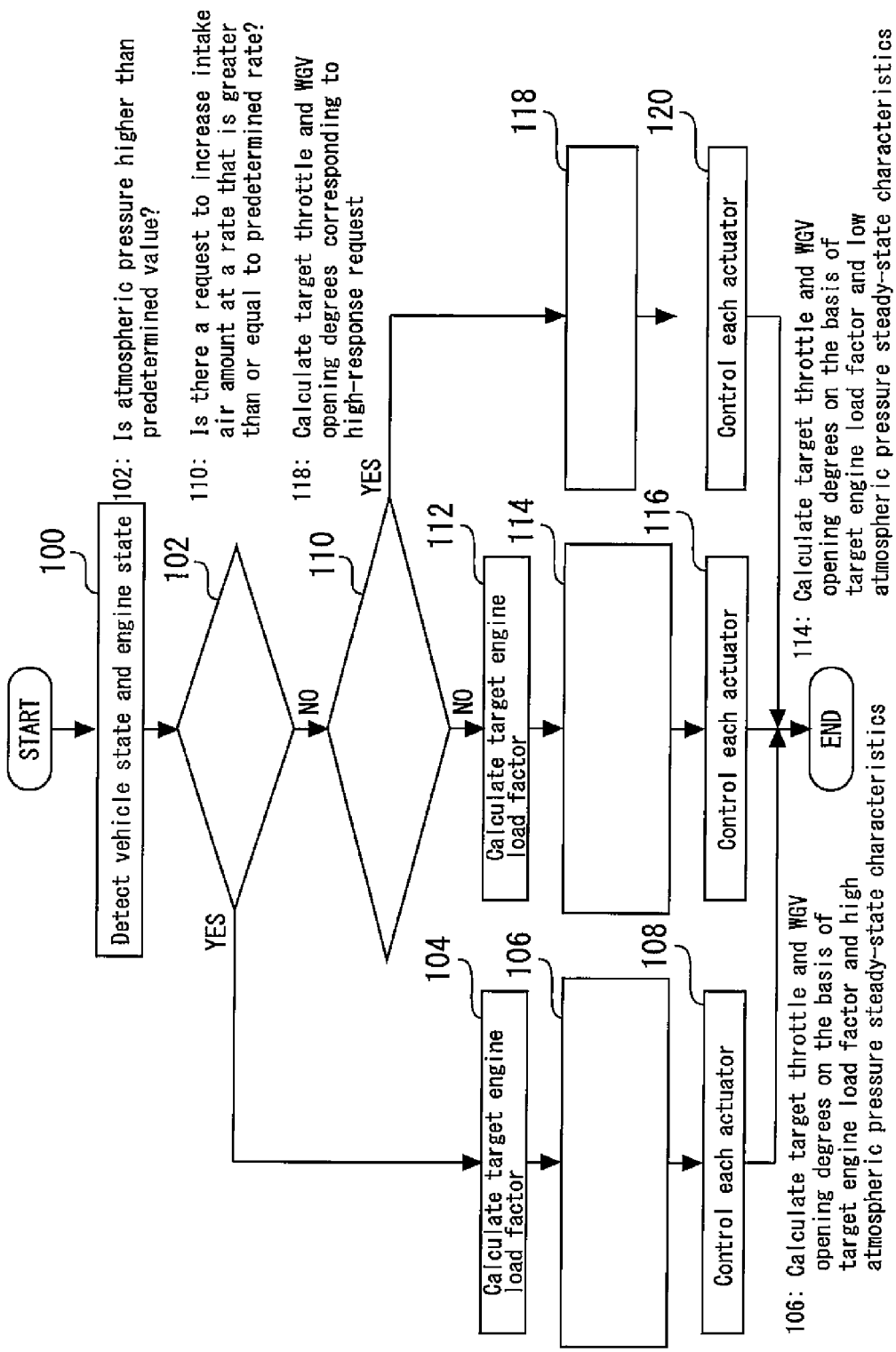
FIG. 4 is a flowchart of a routine that is executed in the first embodiment of the present invention.

FIG. 4 is a flowchart illustrating a control routine that the ECU 50 executes according to the first embodiment to realize the above described throttle and WGV control. It is assumed that the present routine is repeatedly executed for each predetermined control period.

According to the routine shown in FIG. 4, first, various parameters are detected that indicate the state of the vehicle in which the internal combustion engine 10 is mounted and the engine state (step 100). More specifically, in present step 100, by utilizing various sensors illustrated in above described FIG. 1 and various sensors that are not illustrated in the drawings, for example, the vehicle speed, and the accelerator position and a shift position of the transmission (not illustrated in the drawings) as request information from the driver are acquired with regard to the vehicle state. Further, the engine speed, the intake air amount, the engine cooling water temperature, the compression ratio and the like are acquired as the engine state.

Next, by utilizing the atmospheric pressure sensor 56, it is determined whether or not the atmospheric pressure is higher than a predetermined value (step 102). If it is determined as a result that the atmospheric pressure is higher than the aforementioned predetermined value, that is, for example, in a case where the atmospheric pressure corresponds to the standard state, the target engine load factor (target intake air amount) is calculated based on the accelerator position and the engine speed (step 104).

Next, by utilizing the target engine load factor calculated in step 104 and the high atmospheric pressure steady-state characteristics of the throttle and the WGV (waveforms shown by broken lines in FIG. 3), the target throttle opening degree and target WGV opening degree are calculated (step 106). Subsequently, the throttle valve 26 and the WGV 40 are respectively controlled in accordance with the calculated target throttle opening degree and the target WGV opening degree (step 108).

In contrast, if it is determined in step 102 that the current state is a low atmospheric pressure state in which the atmospheric pressure is less than or equal to the aforementioned predetermined value, it is then determined whether or not there is a request to increase the intake air amount at a rate that is greater than or equal to the aforementioned predetermined rate (step 110). More specifically, the determination in present step 110 is performed by comprehensively determining the depression amount and depression speed of the accelerator pedal as well as the shift position of the transmission and the like.

If the result determined in step 110 is not affirmative, that is, in a case where an increase in the intake air amount with a high response is not being requested (a case where a moderate acceleration request is being made), the target engine load factor (target intake air amount) is calculated based on the accelerator position and the engine speed (step 112).

Next, the target throttle opening degree and the target WGV opening degree are respectively calculated utilizing the target engine load factor calculated in step 112 and the low atmospheric pressure steady-state characteristics of the throttle and the WGV (waveforms shown by solid lines in FIG. 3) (step 114). Subsequently, the throttle valve 26 and the WGV 40 are respectively controlled in accordance with the calculated target throttle opening degree and the target WGV opening degree (step 116).

In contrast, if the determination in step 110 is affirmative, that is, in a case where an increase in an intake air amount with a high response is being requested (a case where a rapid acceleration request is being made), a target throttle opening degree and a target WGV opening degree corresponding to a high-response request are calculated (step 118). More specifically, in present step 118, the target throttle opening degree is calculated so as to be a larger value than a value calculated by substituting the target engine load factor at the time of the current high-response request into the low atmospheric pressure steady-state characteristic. For example, the fully-open opening degree is acquired as the target throttle opening degree. With regard to the target WGV opening degree, calculation thereof is performed by substituting the target engine load factor at the time of the current high-response request into the low atmospheric pressure steady-state characteristic. However, if a margin exists with respect to a compressor surge on the low atmospheric pressure steady-state characteristic in the relation with the current target engine load factor, the target WGV opening degree that is acquired in this case may be the minimum opening degree with which a compressor surge can be avoided. Next, the throttle valve 26 and the WGV 40 are controlled in accordance with the calculated target throttle opening degree and the target WGV opening degree, respectively (step 120).

According to the above described routine illustrated in FIG. 4, a high atmospheric pressure steady-state characteristic or a low atmospheric pressure steady-state characteristic is selected as a steady-state characteristic of the throttle and the WGV in accordance with whether or not the atmospheric pressure is higher than the aforementioned predetermined value. Further, in a case where a request to increase the intake air amount with a high response has not been made under a low atmospheric pressure, the throttle opening degree and the WGV opening degree are controlled in accordance with the low atmospheric pressure steady-state characteristic. As a result, a margin for control of the intake air amount (intake pipe pressure) by means of the throttle valve 26 is secured from a medium load region to a high load region. Consequently, in a case where a request to increase the intake air amount with a high response is made thereafter, the intake air amount can be controlled utilizing the margin for control by means of the throttle valve 26 that has been secured. Thus, under a low atmospheric pressure in which the degree of dependence on control of the intake air amount by the turbo-supercharger 22 the responsiveness of which is low increases if the situation is one that does not have the above described low atmospheric pressure steady-state characteristic, the responsiveness of an intake air amount when accelerating from a medium load region to a high load region can be improved by controlling the intake air amount by means of the throttle valve 26 the responsiveness of which is relatively high.

Further, according to the above described routine, in a state (standard state or the like) in which the atmospheric pressure is higher than the aforementioned predetermined value, unlike a state under a low atmospheric pressure, setting of a steady-state characteristic for securing a margin for control of the intake air amount by means of the throttle valve 26 and control that utilizes such a steady-state characteristic are not performed. The above described control at the time of a request to increase an intake air amount with a high response that is executed under a low atmospheric pressure is control in which the fuel consumption deviates from an optimum operating point. Therefore, according to the present embodiment, execution of such control is limited to a time of low atmospheric pressure at which there is a significant influence on the responsiveness of the intake air amount. Thus, according to the present embodiment, in the control of the intake air amount that uses the throttle opening degree and the WGV opening degree, consideration is given to decreasing the frequency of divergence from the optimum fuel consumption operating point.

In the above described first embodiment, a throttle opening degree that is used in the medium load region (KL1 to KL3) under a low atmospheric pressure is set to the predetermined constant opening degree TA1. In this connection, by making the throttle opening degree in the aforementioned medium load region smaller under such a low atmospheric pressure (and making the WGV opening degree smaller in accordance therewith), it is possible to increase a difference between the throttle upstream pressure and the throttle downstream pressure and secure a larger margin for control of the intake air amount by means of the throttle valve 26. However, if the margin for control is secured to an excessive extent, excessive responsiveness will be secured with respect to the intake air amount and may lead to a deterioration in fuel consumption due to the throttle valve 26 closing to a large degree. Therefore, to avoid securing excessive responsiveness of the intake air amount under a low atmospheric pressure, for example, the throttle opening degree that is used in the aforementioned medium load region under a low atmospheric pressure may be set so as to increase as the engine load factor KL (intake air amount) rises (increases), so that a ratio between the pressures before and after the throttle valve 26 (pressure drop rate) becomes constant at a predetermined value (preferably, a value of the current atmospheric pressure/standard atmospheric pressure).

Further, in the above described first embodiment, a configuration is adopted so as to selectively use two kinds of steady-state characteristics, namely, a high atmospheric pressure steady-state characteristic and a low atmospheric pressure steady-state characteristic, according to whether or not the atmospheric pressure is higher than the aforementioned predetermined value. However, a low atmospheric pressure steady-state characteristic that is used under a low atmospheric pressure according to the present invention is not limited to a single setting. That is, a low atmospheric pressure steady-state characteristic according to the present invention may be set, for example, as a characteristic that gradually changes under a low atmospheric pressure so that the throttle opening degree decreases in a medium load region when the atmospheric pressure is low in comparison to when the atmospheric pressure is high, or may be a characteristic that is set continuously so that, under a low atmospheric pressure, the throttle opening degree decreases in a medium load region as the atmospheric pressure becomes lower.

It is noted that, in the above described first embodiment, "steady-state characteristic switching means" according to the present invention is realized by the ECU 50 alternatively executing the above described processing in any one of steps 106 and 114 in accordance with a result determined in step 102, and "first throttle control means" according to the present invention is realized by the ECU 50 executing the above described processing in steps 104 to 108 or steps 110 to 116. Further, "second throttle control means" according to the present invention is realized by the ECU 50 executing the above described processing in steps 118 and 120 in a case where the result determined in step 110 is affirmative, and "WGV control means" according to the present invention is realized by the ECU 50 executing the above described processing in steps 104 to 108 or steps 118 to 120.

Second Embodiment

Next, a second embodiment of the present invention will be described with reference to FIG. 5.

It is assumed that a system of the present embodiment includes the hardware configuration shown in FIG. 1, and executes similar control to the above described first embodiment. On that basis, the present embodiment is configured so that restriction of the operating speed of the throttle valve 26 described hereunder is performed as necessary.

Figure 5:
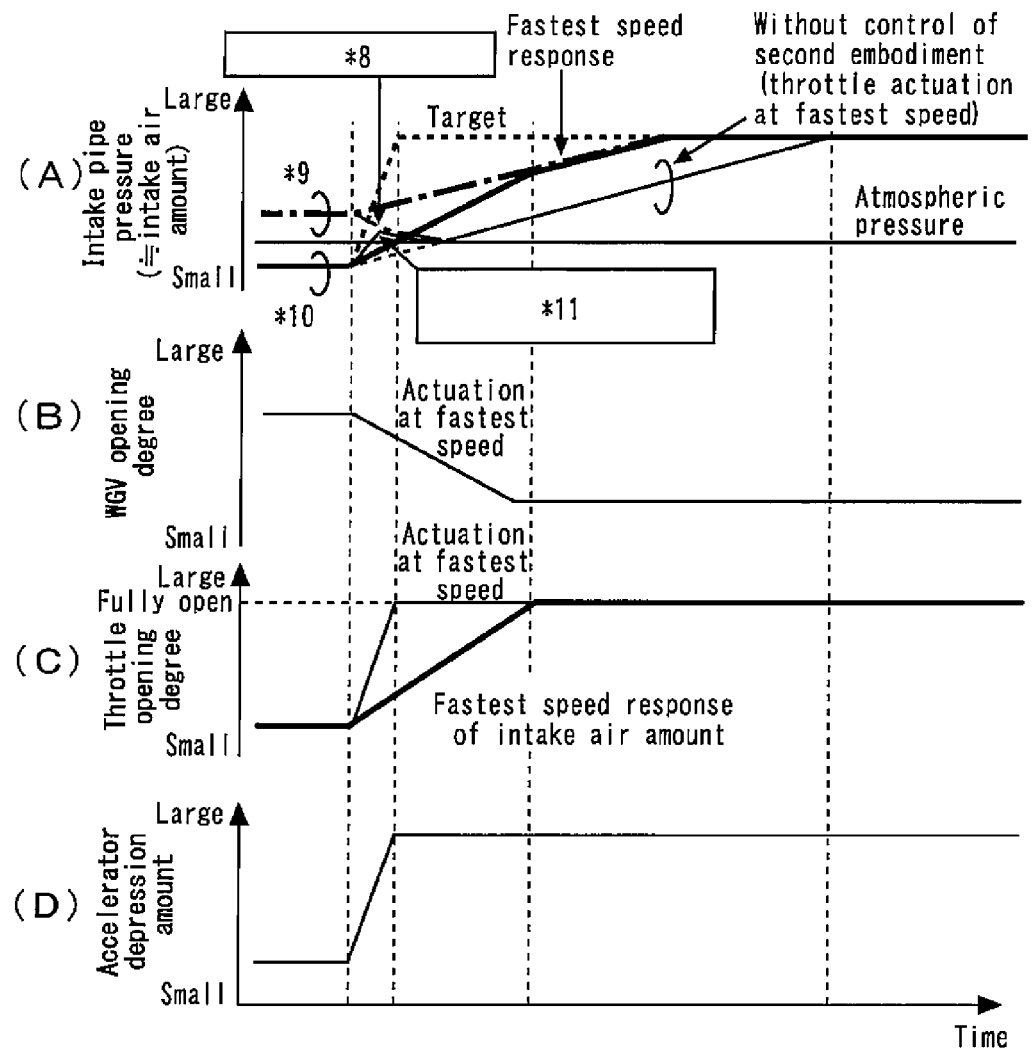
FIG. 5 is a time chart for describing control executed in a second embodiment of the present invention when a request to increase the intake air amount with a high response is made under a low atmospheric pressure.

FIG. 5 is a time chart for describing control executed in the second embodiment of the present invention when a request to increase the intake air amount with a high response is made under a low atmospheric pressure.

According to the control under a low atmospheric pressure of the above described first embodiment, when a request to increase the intake air amount with a high response is made, the responsiveness of the intake air amount can be improved by utilizing a margin for control of the intake air amount (intake pipe pressure) by the throttle valve 26 that is secured.

However, if the speed of opening the throttle valve 26 at the time of a request to increase the intake air amount with a high response is too fast, as described hereunder, conversely, the rate of response of the intake air amount worsens. That is, in a case where depression of the accelerator pedal to request rapid acceleration as illustrated in FIG. 5(D) is detected, if the throttle opening degree and the WGV opening degree are controlled at the maximum operating speed as illustrated by a thin solid line in FIG. 5(C) and by FIG. 5(B) in order to reach a target surge tank pressure (throttle downstream pressure) that is indicated by a broken line in FIG. 5(A) at the fastest speed, the following problem arises.

When the throttle opening degree and the WGV opening degree are both actuated at the fastest speed, the speed at which the throttle valve 26 opens is too fast and compressed air at the downstream of the compressor 22a is likely to be drawn in before the number of turbine rotations increases. As a result, as shown by a thin alternate long and short dashed line in FIG. 5(A), the compressor outlet pressure (≈throttle upstream pressure) decreases in the initial acceleration stage. Further, as shown by a thin solid line in FIG. 5(A), although the surge tank pressure (throttle downstream pressure) rises with favorable responsiveness in the initial acceleration stage, the supercharging does not keep pace therewith, and consequently the pressure increase stagnates temporarily thereafter. Because of this phenomenon, the rate of response of the intake air amount, conversely, worsens.

Therefore, in the present embodiment a configuration is adopted so that, in a case where a request to increase the intake air amount with a high response is made under a low atmospheric pressure, the operating speed of the throttle valve 26 is restricted so as not to exceed a predetermined upper limit value. More specifically, to avoid a drop in the above described compressor outlet pressure that is caused by quickly opening the throttle valve 26, the operating speed of the throttle valve 26 is restricted as shown by a thick solid line in FIG. 5(C).

According to the above described control of the present embodiment, as shown by a thick alternate long and short dashed line and a thick solid line in FIG. 5(A), without leading to a drop in the compressor outlet pressure in the initial acceleration stage, at the time of a request to increase the intake air amount, the compressor outlet pressure and the surge tank pressure can be raised towards a target value at the fastest rate as the rate of response of the intake air amount.

Third Embodiment

Next, a third embodiment of the present invention will be described referring to FIG. 6.

Figure 6:
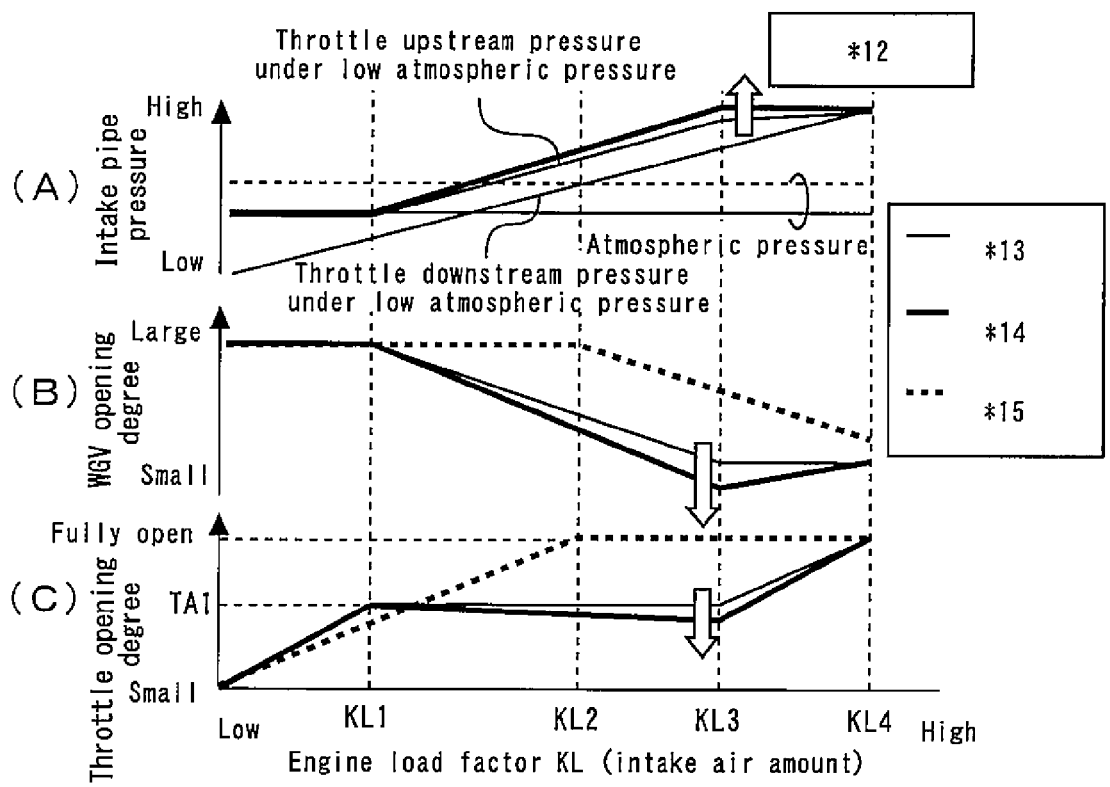
FIG. 6 has views that illustrate a load factor-throttle steady-state characteristic and load factor-WGV steady-state characteristic that are used in a third embodiment of the present invention.

FIG. 6 has views that illustrate a load factor-throttle steady-state characteristic and load factor-WGV steady-state characteristic that are used in the third embodiment of the present invention. It is assumed that the system of the present embodiment is the same as the system of the first embodiment that is described above, except with respect to the points described hereunder referring to FIG. 6.

In the above described first embodiment (and second embodiment), a throttle opening degree that is used in the medium load region (KL1 to KL3) under a low atmospheric pressure is set to the predetermined constant opening degree TA1. In contrast, according to the present embodiment, a throttle opening degree that is used in the medium load region under a low atmospheric pressure is set so as to decrease as the engine load factor KL increases, as shown by a thick solid line in FIG. 6(C).

Further, in accompaniment therewith, as shown by a thick solid line in FIG. 6(B), the WGV opening degree is set so that the smallest opening degree is obtained at a value (on the closing side) that is smaller than in the above described first embodiment at the time of the engine load factor KL3 that is on a low load factor side relative to the time of a full load (KL4). More specifically, as the engine load factor KL increases, the WGV opening degree in the above described medium load region decreases towards the smallest opening degree at the time of the engine load factor KL3. Further, in a region on the side of a higher load factor than the aforementioned medium load region, the WGV opening degree is set so as to increase as the engine load factor KL increases.

According to the settings of the steady-state characteristics described above, a throttle opening degree that is used in the medium load region (KL1 to KL3) under a low atmospheric pressure decreases as the engine load factor KL increases. The medium load region (KL1 to KL3) is a region in which the engine load factor KL (intake air amount) is mainly adjusted by means of the WGV opening degree. Consequently, according to the settings of the present embodiment, in comparison to the settings of the above described first embodiment, as shown in FIG. 6(A), an even larger margin for control of the intake air amount (intake pipe pressure) by the throttle valve 26 can be secured in a region equal to or higher than the aforementioned medium load region. It is thereby possible to further improve the responsiveness of an intake air amount when a request is made to increase the intake air amount with a high response under a low atmospheric pressure.

DESCRIPTION OF SYMBOLS 10 internal combustion engine
12 combustion chamber
14 intake passage
16 exhaust passage
18 air cleaner
20 air flow meter
22 turbo-supercharger
22a compressor of turbo-supercharger
22b turbine of turbo-supercharger
24 intercooler
26 throttle valve
28 throttle opening degree sensor
30 throttle upstream pressure sensor
32 throttle downstream pressure sensor
34 fuel injection valve
36 ignition device
38 exhaust bypass passage
40 waste gate valve (WGV)
50 Electronic Control Unit (ECU)
52 crank angle sensor
54 water temperature sensor
56 atmospheric pressure sensor
58 accelerator position sensor

The invention claimed is:

1. An internal combustion engine, comprising:
a turbo-supercharger including a compressor that is disposed in an intake passage and that supercharges intake air, and a turbine that is disposed in an exhaust passage and that operates by means of exhaust energy;
a throttle valve that is disposed in the intake passage and that adjusts an intake air amount;
an exhaust bypass passage that branches off from the exhaust passage on an upstream side of the turbine, and merges again with the exhaust passage on a downstream side of the turbine;
a waste gate valve that is positioned in the exhaust bypass passage and that adjusts opening and closing an exhaust gas amount in the exhaust bypass passage; and
a controller that is programmed and stored with non-transitory instructions therein being executable to:
(i) determine a steady-state characteristic that defines a relation between an engine load factor and a throttle opening degree in a steady state of the engine;
wherein the steady-state characteristic includes:
a high atmospheric pressure steady-state characteristic that is used under a high atmospheric pressure that is an atmospheric pressure that is higher than a predetermined value; and
a low atmospheric pressure steady-state characteristic that is used under a low atmospheric pressure that is an atmospheric pressure that is less than or equal to the predetermined value;
(ii) switch the steady-state characteristic between the high atmospheric pressure steady-state characteristic and the low atmospheric pressure steady-state characteristic in accordance with whether or not the atmospheric pressure is higher than the predetermined value;
(iii) control a throttle opening degree
a. to increase an intake air amount at a rate of change being less than a predetermined rate,
wherein the throttle opening degree becomes a target throttle opening degree that is obtained based on the high atmospheric pressure steady-state characteristic or the low atmospheric pressure steady-state characteristic that is selected and on a target engine load factor; and
b. to increase an intake air amount at a rate of change that is greater than or equal to the predetermined rate under the low atmospheric pressure,
wherein the throttle opening degree becomes a target throttle opening degree that is greater than a value obtained based on the low atmospheric pressure steady-state characteristic that is selected and on a target engine load factor,
wherein in the low atmospheric pressure steady-state characteristic,
a throttle opening degree corresponding to an identical engine load factor is set to a smaller value in comparison to the high atmospheric pressure steady-state characteristic in a medium load region, and
the throttle opening degree is set so as to increase as the engine load factor increases towards a full load in a region on a side of a higher load factor than the medium load region, and
wherein during the low atmospheric pressure steady-state characteristic, the controller controls the opening degree of the waste gate valve to a value on a closing side, in association with the throttle opening degree corresponding to an identical engine load factor being controlled to a smaller value in comparison to the high atmospheric pressure steady-state characteristic in the medium load region.

2. The internal combustion engine according to claim 1, wherein when increasing the throttle opening degree, the controller further includes the non-transitory executable instructions to restrict an operating speed of the throttle valve so as not to exceed a predetermined upper speed limit value of the throttle valve to minimize or prevent a drop in outlet pressure of the compressor.

3. The internal combustion engine according to claim 1, wherein the controller further includes the non-transitory executable instructions to decrease the throttle opening degree while increasing the engine load factor during the low atmospheric pressure steady-state characteristic being set in the medium load region.

* * * * *